(No Model.)
J. B. MOORMAN.
RIDGE PLOW.
No. 352,929. Patented Nov. 23, 1886.
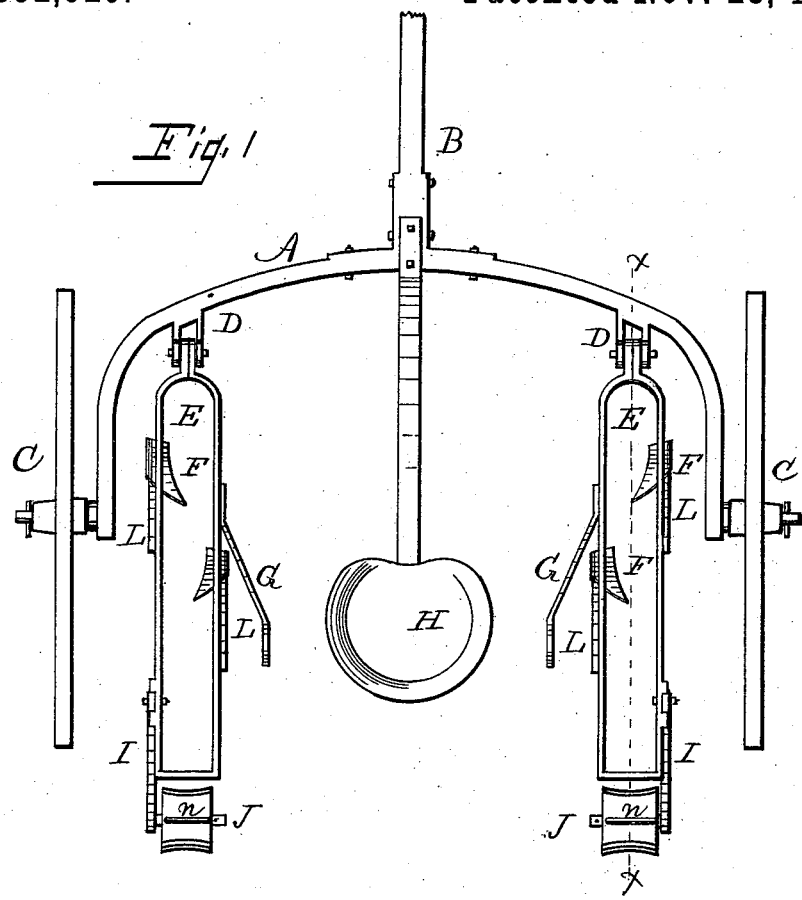
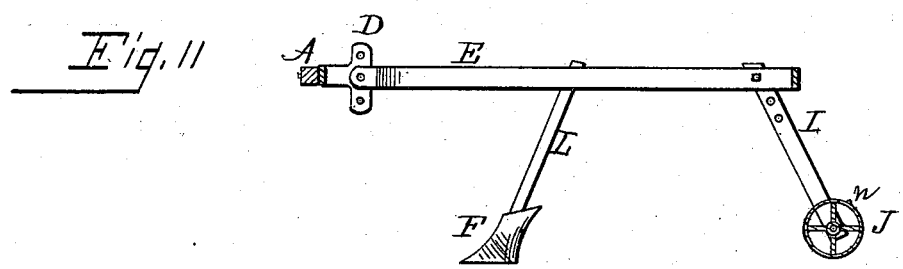
Witnesses
Will. C. Kette
James Turpin
Inventor
John B. Moorman
By His Attorney C. B. Pickering

UNITED STATES PATENT OFFICE.

JOHN B. MOORMAN, OF DAYTON, OHIO.

RIDGE-PLOW.

SPECIFICATION forming part of Letters Patent No. 352,929, dated November 23, 1886.

Application filed July 24, 1886. Serial No. 208,997. (No model.)

*To all whom it may concern:*

Be it known that I, JOHN B. MOORMAN, a citizen of the United States, residing at Dayton, in the county of Montgomery and State of Ohio, have invented certain new and useful Improvements in Ridge-Plows; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to improvements in ridge-plows, and to which is attached a leveling-roller with a marker on its face. The several features of the implement will be fully hereinafter set forth.

The mechanism is illustrated in the accompanying drawings, in which Figure I is a top view or plan of the ridge-plow. Fig. II is a longitudinal section of the plow-frame on the line *x*, Fig. I.

Like letters designate like parts throughout the several views.

A is a metallic axle bent horizontally, the tongue B being attached to the center of said axle at the front, and to the ends are attached the spindles on which the ground-wheels C turn.

On the rear side of the axle are attached the stirrups D. These stirrups are provided with a series of holes, so that the front ends of the plow-frames E may be raised or lowered. These frames are attached to the stirrups by pins. The plow-frames E are made of bars of iron. The bars are bent squarely at the back end, the sides are parallel, and the ends are bent together at the front and perforated for the reception of a pin.

To the plow-frames are attached the bars L, and to these are attached the plows or shovels F. The faces of the two series of shovels turn inwardly, and consequently the earth moved thereby is thrown together, thus forming ridges. Within guides on the external surfaces of the plow-frames are held by bolts the arms I, to which are attached spindles for the leveling-rollers J. The projections *n* on the face of these rollers serve to mark the position for the hill.

To the sides of the plow-frames are attached the handles G, the use of which being to raise the plows out of the soil. The operator is mounted on the seat H, which is supported from the axle. The arm I has a series of holes for the adjustment of the leveling-rollers, and the depth the shovels penetrate the soil may be regulated thereby.

The operation is thus: The two sets of plows carry the soil together, thus forming two ridges. The rollers level the same, and the projections make a mark which indicates the position for the hill. It is adapted to forming ridges for tobacco and other plants.

What I claim, and desire to secure by Letters Patent, is—

1. In a ridge-plow, the iron frame E, with parallel sides and pivoted to stirrups of the axle, in combination with arms L, shovels F, and the curved mounted axle, substantially as set forth.

2. In a ridge-plow, the iron frame E, with parallel sides and pivoted to stirrups attached to the axle, in combination with arms L, shovels F, and leveling-roller J, with marker on the face thereof, substantially as set forth.

In testimony that I claim the foregoing as my own I affix my signature in presence of two witnesses.

JOHN B. MOORMAN.

Witnesses:
 B. PICKERING,
 SUMNER T. SMITH.